United States Patent
Jeon

(10) Patent No.: US 8,608,813 B2
(45) Date of Patent: Dec. 17, 2013

(54) METHOD OF MANUFACTURING SOLID FUEL MAINLY INCLUDING SYNTHETIC RESIN-PULP SCRAP

(76) Inventor: Young Cheol Jeon, Pyeongtaek-si (KR)

( * ) Notice: Subject to any disclaimer, the term of this patent is extended or adjusted under 35 U.S.C. 154(b) by 84 days.

(21) Appl. No.: 13/434,751

(22) Filed: Mar. 29, 2012

(65) Prior Publication Data

US 2012/0247004 A1  Oct. 4, 2012

(30) Foreign Application Priority Data

Mar. 30, 2011  (KR) .......................... 10-2011-0028880

(51) Int. Cl.
*C10L 5/48* (2006.01)

(52) U.S. Cl.
USPC ........................................... 44/579

(58) Field of Classification Search
USPC .............................. 44/579; 201/4
See application file for complete search history.

(56) References Cited

U.S. PATENT DOCUMENTS 6,875,317 B1 *  4/2005  Toyoda ........................ 201/4

FOREIGN PATENT DOCUMENTS

| KR | 153205 | 2/1998 |
|----|--------|--------|
| KR | 162130 | 8/1998 |
| KR | 10-407374 | 11/2003 |
| KR | 10-709012 | 4/2007 |

* cited by examiner

*Primary Examiner* — James Goloboy
*Assistant Examiner* — Chantel Graham
(74) *Attorney, Agent, or Firm* — Novick, Kim & Lee, PLLC; Jae Youn Kim

(57) ABSTRACT

Disclosed are eco-friendly and low-price solid fuel, which is naturally dried, and a method of manufacturing the same. Disposable diapers or disposable sanitary pads, which are failed during the manufacturing process, are used to produce industrial alternative fuel having a low price through a predetermined process, so solid fuel having no pollution problem in combustion is provided. The solid fuel is mainly made of synthetic resin-pulp scrap including synthetic resin integrated with pulp like the disposable diapers or the disposable sanitary pads. The method includes introducing a scrap, such as the wasted disposable diaper or the wasted disposable sanitary pad, including synthetic resin integrated with pulp into a crusher to break the scrap into fragments, adding a slight amount of waste cooking oil serving as a binding agent to the fragments, performing an extrusion-molding with respect to the fragments, cutting the extrusion-molded fragments to make pallets, and then drying pallets.

1 Claim, 1 Drawing Sheet

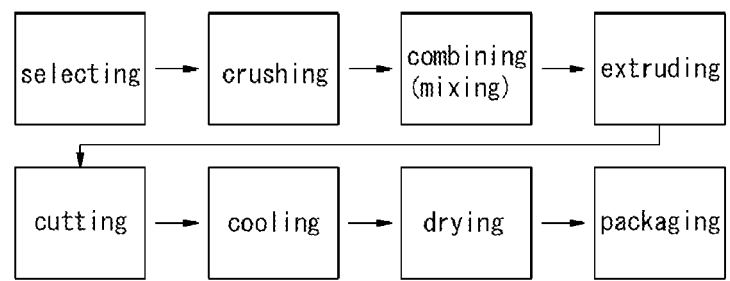

METHOD OF MANUFACTURING SOLID FUEL MAINLY INCLUDING SYNTHETIC RESIN-PULP SCRAP

BACKGROUND OF THE INVENTION

1. Field of the Invention

The present invention relates to a method of manufacturing solid fuel mainly including synthetic resin-pulp scrap, capable of manufacturing solid fuel producing the sufficient quantity of heat by recycling pulp and a waterproof membrane made of a synthetic resin film, which are main materials of scrap failed in the manufacturing process and cannot be technically separated from each other so that the pulp and the waterproof membrane cannot but be incinerated.

2. Description of the Related Art

There have been provided following various schemes to produce solid fuel by using scrap. In detail, after a combustion improver is added to combustible scrap such as a waste tire without a wire, the combustible scrap may be heated and extruded to obtain the solid fuel (e.g., Korea Patent Registration No. 709012). After crushing and selecting synthetic resin scrap and pulp scrap, or paper scrap, the above scrap may be carbonized by adding chemicals thereto (e.g., Korea Patent Registration No. 407374). After adding fish and shell fish used to remove a bed smell to combustible scrap, the scrap may be heated and extruded (e.g., Korea Patent Registration No. 390933). After crushing, selecting, and forcibly drying combustible scrap, a binding agent may be added to the scrap and the scrap may be extruded (e.g., Korea Patent Registration No. 162130). After adding organic solvents such as cellulose and acetone to wooden flour and activated carbon, the wooden flour and the activated carbon may be subject to an extrusion-molding work (e.g., Korea Patent Registration No. 153205).

The regenerated solid fuel mainly including combustible scrap according to the related art causes following several problems. In detail, a metallic component is incompletely removed so that the inner parts of the unit of forcibly conveying the solid fuel and extrusion dies may be damaged, non-carbonized vestige (sludge) may be made after combustion, and the shape of the extruded material cannot be maintained so that a binding agent is added, thereby increasing the coat and releasing pollutants the atmosphere. In addition, an accelerant, a combustion improver, or organic solvent is added so that the cost may be increased and a toxic substance may be produced in combustion.

Recently, demands for disposable diapers and disposable sanitary pads have been rapidly increased as substitutes of cloth diapers because the disposable diapers and disposable sanitary pads reduce the burden of washing and repairing. The disposable diapers and the disposable sanitary pads, which have the superior absorbable property of urination and secretion, are soft and have a small volume, are produced by bonding a waterproof cloth made of a synthetic resin film to user-friendly pulp and patterning the bonded material.

Since the disposable diapers and the disposable sanitary pads failed in bulk during the production process may not be recycled especially, the whole quantity of the failed disposable diapers and sanitary pads must be discarded. In this case, the failed disposable diapers and sanitary pads are discarded only through the incineration scheme. This is because the disposable diapers and sanitary pads are not melted in water, and not decomposed even if the disposable diapers and sanitary pads are buried under the ground. In addition, when the disposable diapers and sanitary pads are neglected outdoors, the disposable diapers and sanitary pads pollute soil and water due to the synthetic resin waterproof cloth thereof.

Since an amount of recyclable pulp is significantly greater than an amount of the non-recyclable waterproof cloth (made of synthetic resin), if the disposable diapers and sanitary pads failed in bulk during the production process are usefully utilized rather than being incinerated, the failed disposable diapers and sanitary pads may be considered to produce alternative fuel in terms of the nature conservation and the resource saving.

However, only a scheme of producing solid fuel by using typical combustible scraps such as the wasted tire, the synthetic resin scrap, the paper scrap, or wooden flour is attracted, and the recycling of the wasted disposable diapers and sanitary pads is indifferent because it is difficult to dispose the urination and secretion.

In fact, if the failed disposable diapers and sanitary pads are simply incinerated, great resource loss may occur in terms of resource regeneration because the pulp is discarded even though the pulp is sufficiently recyclable. In addition, the incineration of the waterproof cloth including a synthetic resin component may cause a bad smell and the production of the pollutant, which are unfavorable in terms of the environment.

Among the related arts, regarding synthetic resin scrap and paper scrap or pulp scrap in Korea patent registration No. 407374 disclosing a process of crushing and selecting synthetic resin scrap and pulp scrap, or paper scrap, a synthetic resin component and a pulp component are not separately selected from the scrap in which synthetic resin is bonded to the pulp, but the synthetic resin scrap, which causes a problem such as the release of the pollutant in combustion but is not suitable for solid fuel, is separated from the wastes in which collected synthetic resin-paper scrap or collected pulp scrap are mixed with each other. Accordingly, it is difficult to apply the process of crushing and selecting synthetic resin scrap and pulp scrap, or paper scrap to the wastes such as disposable diapers and disposable sanitary pads in which pulp is bonded to the waterproof cloth so that the pulp is integrated with the water cloth.

SUMMARY OF THE INVENTION

Accordingly, the present invention has been made keeping in mind the above problems occurring in the prior art, and an object of the present invention is to provide a method of manufacturing eco-friendly and low-price solid fuel mainly including synthetic resin-pulp scrap, such as a diaper or a disposable sanitary pad, which is made of synthetic resin integrated with pulp and cannot but be incinerated.

To accomplish the object, according to one aspect of the present invention, there are provided a method of manufacturing solid fuel mainly including synthetic resin-pulp scrap and eco-friendly and low-price solid fuel which is manufactured through the method and naturally dried. The method includes introducing a scrap, such as a wasted disposable diaper or a wasted disposable sanitary pad, including synthetic resin integrated with pulp into a crusher to break the scrap into fragments, adding a slight amount of waste cooking oil serving as a binding agent to the fragments, performing an extrusion-molding with respect to the fragments, cutting the extrusion-molded fragments to make pallets, and then drying pallets.

As described above, according to the present invention, wastes of disposable diapers or sanitary pads failed during the manufacturing process, which cannot but be incinerated without alternate use, are processed as useful solid fuel, so that the wastes of the disposable diapers or sanitary pads can be used as low-price industrial alternative fuel.

In addition, since waste cooking oil serves as a binding agent necessary for maintaining the extrusion shape of fragments obtained by crushing the disposable diapers or the disposable sanitary pads which cannot be extruded due to the great volume thereof, the manufacturing cost of the solid fuel mainly including combustible scrap can be significantly reduced, and the bad smell or the pollutants are never produced differently from typical binding agents.

BRIEF DESCRIPTION OF THE DRAWINGS

The above and other objects, features and other advantages of the present invention will be more clearly understood from the following detailed description when taken in conjunction with the accompanying drawings, in which:

FIG. 1 is a flowchart showing the manufacturing process of solid fuel according to the present invention.

DETAILED DESCRIPTION OF THE INVENTION

Hereinafter, exemplary embodiments of the present invention will be described in detail with reference to accompanying drawings.

A representative article made of synthetic resin integrated with pulp powders includes a disposable diaper or a disposable sanitary pad. Since the wasted disposable diaper and the wasted sanitary pad produced during the manufacturing process include the mixture of synthetic resin and pulp, the waste scrap must be collected by separating synthetic resin from pulp when taking an environmental problem and a disposing process into consideration.

The disposable diaper and the disposable sanitary pad failed in the manufacturing process are introduced into a crusher without distinguishing between materials constituting the diaper or the pad and broken into fragments. As the fragments have smaller sizes, the binding agent added to the fragments in the following process can be easily infiltrated into the fragments, and the fragments can be easily conveyed by a screw conveyer and can be extruded at a high density by dies.

As generally known to those skilled in the art, the disposable diaper and the disposable sanitary pad are formed by bonding a waterproof cloth made of a flexible synthetic resin film to the bottom surface of a thick pulp layer. It is actually impossible to separate the pulp from the waterproof cloth in the waste, and the machine or device to separate the pulp from the waterproof cloth is not developed yet. Nevertheless, if the pulp must be separated from the waterproof cloth, manpower must be supplied. However, the work of manually separating the pulp from the waterproof cloth in a greater amount of disposable diapers and disposable sanitary pads is actually difficult and requires huge personnel expenses.

In this regard, instead of a scheme of separately extracting only pulp, which less causes an environment problem in combustion, from the failed disposable diapers and the failed disposable sanitary pads, the failed disposable diapers or the failed disposable sanitary pads having the pulp, which is not separately extracted, must be conveyed by using a screw conveyer while mixing the binding agent with the disposable diapers or the disposable sanitary pads, and agglomerating and fragmenting the disposable diapers or the disposable sanitary pads for the purpose of the most convenience in the manufacturing process.

If the fragments of the waste have excessively great sizes, the fragments are significantly scattered when the fragments are dropped into a hopper installed in the screw conveyer, so that the fragments are not easily introduced into an inlet port of the screw conveyer. Accordingly, the fragments of the disposable diapers or the disposable sanitary pads may not be smoothly conveyed. In addition, since the conveyance density is low when the fragments are conveyed by the screw conveyer, a high-density extrusion may not be formed, in detail, the shape of the solid fuel may not be maintained after the extrusion has been performed. Therefore, as the size of the fragments is reduced, the above problems are not caused.

The fragments of the waste are put into the inlet port of the screw conveyer through a discharge port provided at the lower end of the hopper. If the fragments are compressed by the conveyance pressure of the screw conveyer and the frictional force of the peripheral portion of a cylinder and reach the dices, the conveyance density is maximized.

A nozzle for a binding agent is installed in an entry of the cylinder of the screw conveyer. The nozzle is used to spray the binding agent on the fragments of the synthetic resin-pulp scrap so that the fragments of the synthetic resin-pulp scrap are bound with each other. Preferably, a plurality of nozzles are installed at a uniform interval in a conveyance direction so that the binding agent is infiltrated into the fragments of the synthetic resin-pulp scrap which are loosely bound with each other in the initial stage of the conveyance of the waste, or uniformly distributed at equally divided points of the circumference of the cylinder in a spiral direction.

The binding agent according to the present invention includes waste cooking oil. The use range of the waste cooking oil is not wide except for the recycled soap. The waste cooking oil has many demands and can be easily collected. In addition, when comparing with the price of cellulose, resin, or general-purpose oil, the price of the waste cooking oil is very economical. In addition, the concentration of the waste cooking oil can be easily adjusted. Further, even if the waste cooking oil is incinerated, the waste cooking coil does not cause the environmental pollution and the bad smell.

As the use of the waste cooking oil is reduced, the cost is reduced, and the bad smell and the soot are reduced. The waste cooking oil is preferably sprayed at a weight ratio in the range of about 5 weight % to about 10 weight % with respect to the total weight of the waste fragments. If an amount of the waste cooking oil is less than a reference value, the binding property between the fragments of the waste is lowered, so that the shape of an extrusion may not be maintained. In addition, the fluffs of the fragments of the waste are blown in the working place during the working process, so that the respiratory disease of the worker may be caused. If the amount of the waste cooking oil exceeds the reference value, the cost required to obtain the waste cooking oil is uneconomically increased. In addition, the binding state of the fragments of the waste is weak, so that the extruded shape of the waste fragments may not be maintained.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:
1. A method of manufacturing solid fuel mainly including synthetic resin-pulp scrap, the method comprising:
  breaking a waste including a disposable diaper or a disposable sanitary pad, which is failed in a manufacturing process and formed by bonding a synthetic resin waterproof film to a bottom surface of a pulp, into fragments;

conveying the fragments of the waste by a screw conveyer while spraying a binding agent on the fragments and mixing the fragments with each other; and extruding the mixed waste by an extruder and drying the waste, wherein the binding agent includes a waste cooking oil, the waste cooking oil is sprayed at a weight ratio in a range of about 5 weight % to about 10 weight % with respect to a total weight of the fragments of the waste, and the waste cooking oil is sprayed through a plurality of nozzles which are installed in an entry of a cylinder of the screw conveyer at a uniform interval in a conveyance direction of the screw conveyer, or uniformly distributed at equally divided points of circumference of the cylinder in a spiral direction.

* * * * *